UNITED STATES PATENT OFFICE.

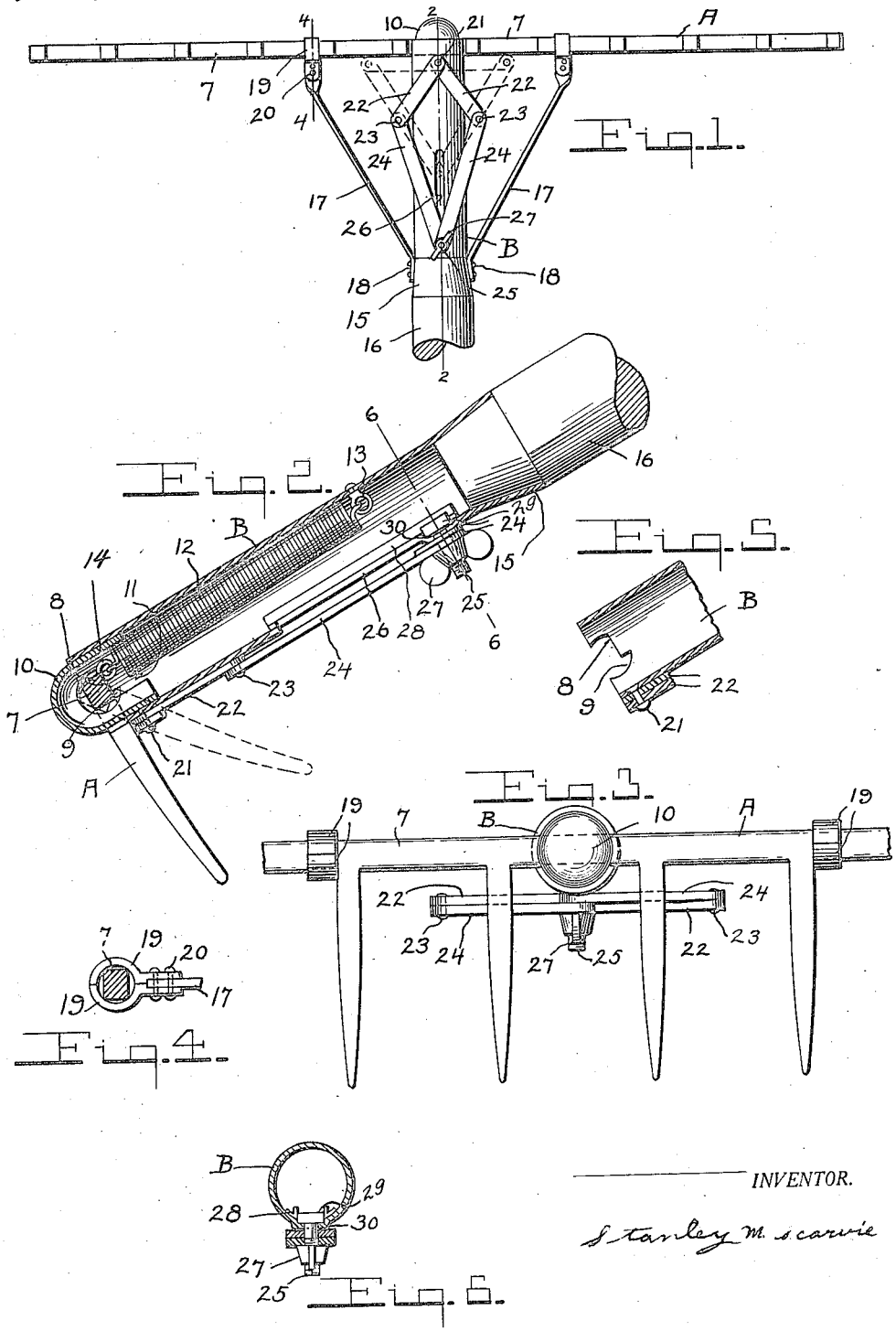

STANLEY M. SCARVIE, OF DECORAH, IOWA.

SELF-CLEANING RAKE.

1,425,219. Specification of Letters Patent. Patented Aug. 8, 1922.

Application filed June 2, 1920. Serial No. 386,134.

*To all whom it may concern:*

Be it known that I, STANLEY M. SCARVIE, a citizen of the United States, residing at Decorah, in the county of Winneshiek and State of Iowa, have invented certain new and useful Improvements in a Self-Cleaning Rake, of which the following is a specification.

My invention relates to rakes generally and the main object is to provide a novel and efficient means for rendering them self-cleaning.

Another object is to provide such an article with the rake head capable of swinging relatively to the handle or staff but to normally remain in usual operative position.

A further object is to provide the structure with means whereby, when desired, it may be used as an ordinary rake, that is without the self-cleaning feature.

Additionally, I aim to provide means for ready attachment or detachment of the rake head, means to permit swinging movement of the rake head, means to urge the rake head into a normal operative position, and means to fasten the rake head against swinging movement.

Further objects and advantages will appear hereinafter from the description following taken in connection with accompanying drawings illustrating one preferred embodiment.

In said drawings:—

Figure 1 is an inverted plan view of a rake embodying my improvements;

Figure 2 is a view taken substantially on the line 2—2 of Figure 1;

Figure 3 is a partial front elevation of the rake;

Figure 4 is a cross sectional view on the line 4—4 of Figure 1, and

Figure 5 is a detail longitudinal sectional view of the attaching sleeve or thimble employed.

Figure 6 is a transverse section on line 6—6 of Figure 2.

Referring specifically to the drawings, wherein like reference characters designate like or corresponding parts, my improvements may be used in connection with any usual form of rake head, for instance the lawn rake head A. The upper bar 7 of this rake head is disposed in aligned slots or recesses 8 in the outer end of an attaching sleeve or thimble B. This bar at times turns in slots 8 and they are therefore enlarged at 9 to accommodate the turning movement. The outer end of sleeve B is normally closed by means of a cap 10, open or slotted at 11 to permit passage over the bar 7 and its turning. This cap may fit the interior of the sleeve B friction tight or be otherwise removably fastened in any suitable way. Within sleeve B a retractile coil spring 12 is disposed, being removably fastened to an eyelet 13 of the sleeve and an eyelet 14 of the bar 7.

The inner end of the sleeve B is flared outwardly into a ferrule 15 which removably receives the ordinary staff or handle 16. Braces or struts for the handle may be provided at 17, being fastened to the ferrule and handle at 18. Surrounding the bar 7 are journals made in separable sections 19 and fastened together and to the braces 17 at 20.

Pivoted to the under surface of the sleeve B at 21 are links 22, which are pivoted at 23 to links 24, pivoted together by means of a bolt 25. This bolt extends through and moves in an elongated slot 26 provided in the under surface of the sleeve. A winged adjusting nut 27 moves on the threads of the bolt 25 and the head 29 of the bolt is preferably square so that it may be held against turning but slidably by ribs 28 on opposite sides of the slot 26. At the inner end of the slot 26 a depression 30 occurs which receives the nut when in innermost or usual position to more securely hold it and the bolt against accidental displacement.

In use, with the parts positioned as shown in full lines in Figure 2, the spring 12 holds the bar 7 against the flat wall of the recesses 8 which prevents the rake head turning as the rake head is drawn toward the operator. However, when the rake head is pushed away from the operator, the rake head will move into the dotted line position of Figure 2, and the passing of the tines over the ground will remove the collected material. During this swinging movement of the rake head, the links 22 are in the full line position of Figure 1. However, should it be desired to maintain the rake head rigid with the sleeve and handle to operate as a usual rake, nut 27 is loosened and the bolt 25 is moved in slot 26 toward the rake head, resulting in the links 24 moving the links 22 into alignment as shown in the dotted line position of Figure 1. In this position, links 22 abut the tines of the rake head and hold it rigid.

Other adaptations of the invention than that shown may be made, for instance in a lawn rake where the teeth or tines of the rake head extend on opposite sides, both above and below the handle. In such instances, the slot 26, pivot 21, links 22 and 24 and associated parts may be duplicated on opposite sides of the sleeve B and be operable independently and selectively according to the size of the rake to be used.

Changes in the details of construction may be resorted to within the spirit and scope of the invention.

I claim:—

1. A rake having a head, a sleeve provided with slots extending inwardly from an end thereof having flat walls and enlarged portions, a spring within the sleeve normally maintaining the head in engagement with the flat walls, a closure for said sleeve to receive and prevent accidental detachment of the head, said sleeve having a second slot, links pivoted on the sleeve, links pivoted to said links, a securing means pivoting the second mentioned links together and disposed in said second slot and operable to move the first mentioned links against the head.

2. A rake having a head, a sleeve provided with slots extending inwardly from an end thereof having flat walls and enlarged portions, a spring within the sleeve normally maintaining the head in engagement with the flat walls, a closure for said sleeve having slots to receive and prevent accidental detachment of the head, said sleeve having a second slot, links pivoted on the sleeve, links pivoted to said links, a securing means pivoting the second mentioned links together and disposed in said second slot and operable to move the first mentioned links against the head, braces connected to the sleeve, separable bearings on said braces, and said bearings journalling said head.

3. A rake having a movable head, links movable into and out of engagement with the head to prevent and permit movement thereof, links pivoted to said links, and means pivotally joining the second links capable of fastening them in adjusted position.

In testimony whereof, I have affixed my signature in the presence of two witnesses:

STANLEY M. SCARVIE.

Witnesses:
 WALTER B. SCARVIE,
 WM. JOHNSON.